No. 896,109. PATENTED AUG. 18, 1908.
K. HENKE.
POTATO DIGGER.
APPLICATION FILED MAR. 13, 1908.

Witnesses.
A J Haddan
S. Ford

Inventor
Karl Henke
by R Haddan
Attorney

UNITED STATES PATENT OFFICE.

KARL HENKE, OF GROSS BURGWEDEL, NEAR HANOVER, GERMANY.

POTATO-DIGGER.

No. 896,109.  Specification of Letters Patent.  Patented Aug. 18, 1908.

Application filed March 13, 1908. Serial No. 420,894.

*To all whom it may concern:*

Be it known that I, KARL HENKE, farmer, and a subject of the German Emperor, residing at Gross Burgwedel, near Hanover, in the German Empire, have invented a certain new and useful Improvement in Potato-Diggers, of which the following is a specification.

This invention relates to potato diggers of the type wherein a lateral plow-share digs up the potatoes, and guides them for cleansing purposes, to a rotating sieve, from which the potatoes are conveyed by an elevator to a box, bag, or the like provided for their reception.

The purpose of the invention is to obtain a more thorough cleansing of the potatoes in the sieve, and the invention substantially consists in providing means whereby the sieve is shaken during its rotation, so that the soil adhering to the potatoes is removed by friction.

Figure 1:
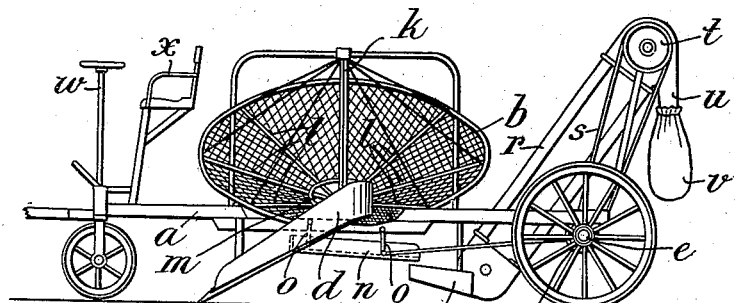
Figure 2:
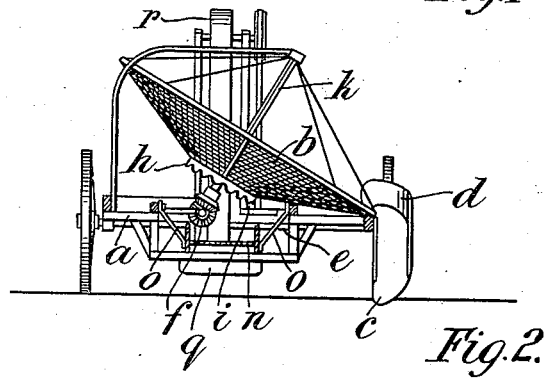
Figure 3:
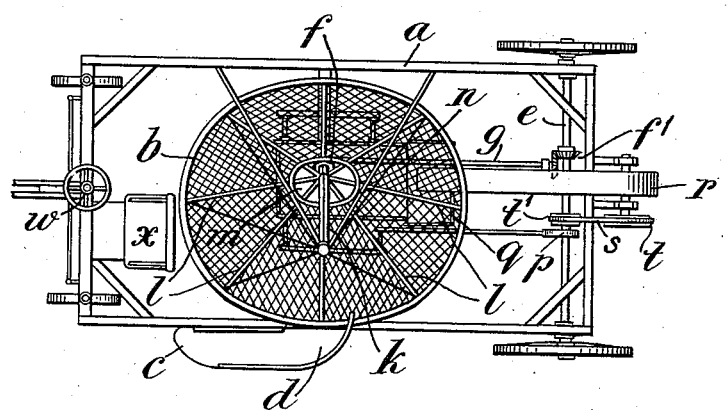

A construction embodying the invention is illustrated in the annexed drawing, in which Figure 1 is a side view of the machine, Fig. 2 a front view, with certain parts removed, and Fig. 3 a plan view.

The machine comprises a vehicular frame $a$ on which is mounted an inclined, conical sieve $b$ with radial ribs $l$ protruding from its upper surface. At one side of the machine there is a plow-share $c$, which is adapted to dig up the potatoes and has a trough-like prolongation $d$ up which the potatoes slide to the sieve $b$. The latter is slidable on an axle $k$ and may be rotated in any suitable manner for example by connecting the axle $k$ by bevel gears $f$, shaft $g$, and bevel gears $f^1$ to the rear-axle $e$ of the machine. To the under part of the sieve is fixed a ring $h$ having a corrugated or undulating under-surface, in contact with a cam $i$, so that when the sieve is rotated the cam imparts thereto an axial reciprocating movement and shakes the potatoes in the sieve, causing the soil to be rubbed off the surfaces thereof.

The potatoes carried upwards by ribs $l$ during the rotation of the sieve slide towards the center of the sieve and fall through a hole $m$ on to an inclined grating $n$, supported by movable arms $o$ and rocked by means of an eccentric $p$ fixed to the rear axle $e$ of the machine. From the grating $n$ the potatoes roll into a trough $q$, from which they are conveyed by a conveyer $r$ to a short, wide tube $u$ having a bag $v$ attached to its lower, open end. The conveyer is operated by a pulley $t$ connected by a belt $s$ to a pulley $t^1$ on the rear axle $e$. A steering-pillar and wheel $w$ are arranged at the front part of the machine, with a seat $x$ for the driver.

What I claim as my invention and desire to secure by Letters Patent of the United States is:—

A potato-digger comprising in combination a vehicular frame, a lateral plow-share carried thereby, a rotatable sieve adapted to receive the potatoes dug up by said plow-share and cam-mechanism for causing said sieve to be shaken during its rotation, for the purpose set forth.

In witness whereof I have signed this specification in the presence of two witnesses.

KARL HENKE.

Witnesses:
ROBERT V. BÜLOW,
W. BINNE.